Jan. 20, 1953 H. B. LEWIS ET AL 2,626,033
CENTRIFUGAL SERVO CLUTCH
Filed April 3, 1948
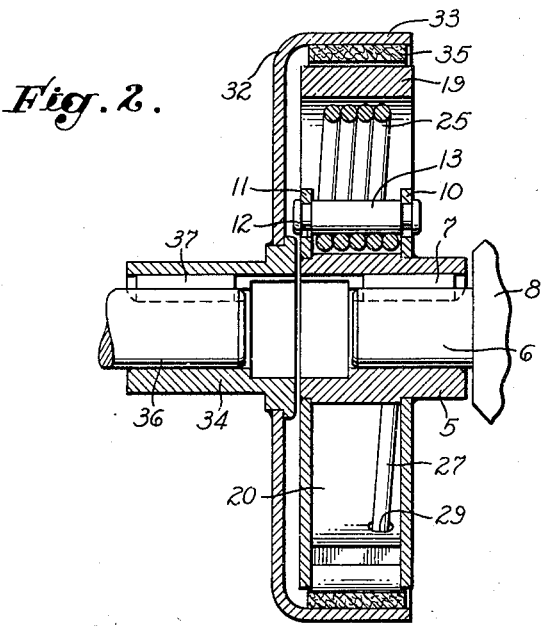
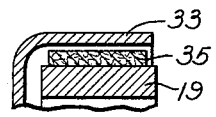
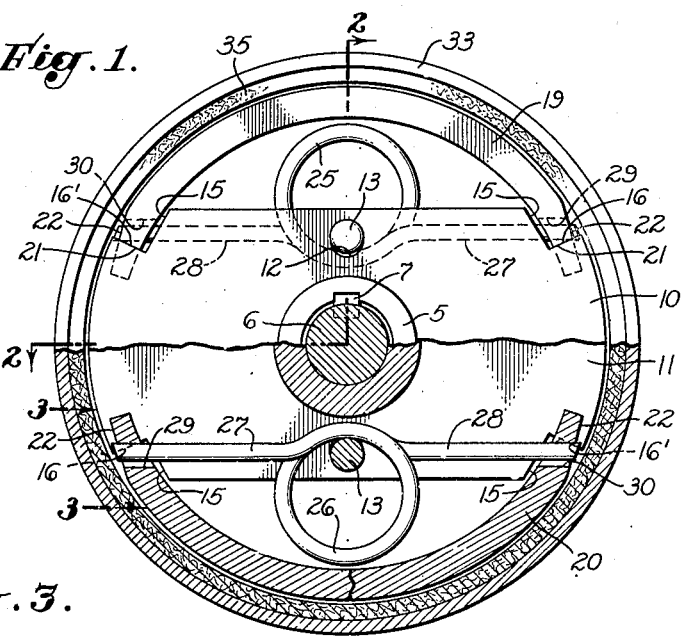
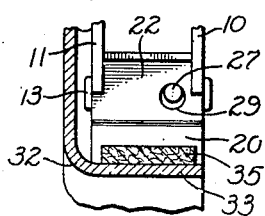
INVENTORS.
HOWARD B. LEWIS
HOWARD FIELD, JR.
BY THEIR ATTORNEYS.
HARRIS, KIECH, FOSTER & HARRIS Patented Jan. 20, 1953

2,626,033

UNITED STATES PATENT OFFICE 2,626,033

CENTRIFUGAL SERVO CLUTCH

Howard B. Lewis and Howard Field, Jr.,
Los Angeles, Calif.

Application April 3, 1948, Serial No. 18,758

4 Claims. (Cl. 192—105)

Our invention relates to power transmission mechanism and more particularly to a clutch device for releasably connecting two rotatable elements for unitary rotation.

It is an important object of the invention to provide a clutch device which is extremely simple in construction, economical to manufacture, and highly efficient in performing its intended function.

Another object is to provide a clutch device of the centrifugally-operated type having a driving member and centrifugally-operated clutch shoes floatingly mounted on the driving member and adapted to engage with the clutch surface of a drum to rotate the latter, the shoes being normally withheld from outward radial movement by torsion springs carried by the driving member. It is a further and important object of the invention to provide interengaging abutment faces on the shoes and the driving member, these faces being so disposed that the shoes exert tangential forces which are in excess of the product of the outward pressure of the shoes, due to centrifugal force, against the clutch surface of the drum times the coefficient of friction between the clutch surface and the shoes so that the clutch elements tend to tighten themselves into firm and positive clutching engagement.

Another object is to provide a clutch device in which the clutch shoes and their torsion springs are symmetrical so that the device can be employed for clutching together two elements for rotation in either direction.

Another object is to provide a clutch device in which the driving member comprises a hub, adapted to be connected to a prime mover, and is provided with axially-spaced plates disposed in planes normal to the axis of the hub and between which the clutch shoes are floatingly positioned and the springs are mounted. By this construction, the parts named above are adapted for assembly as a unit without the use of screws, nuts or other similar fastening means so as to greatly simplify the structure and maintain its cost of manufacture at a minimum.

Further objects of the invention will appear from the following description and the drawing, which is intended for the purpose of illustration only, and in which:

Fig. 1 is a part-sectional end view of the clutch device, the parts of the device being shown in inoperative position;

Fig. 2 is a cross-sectional view, taken on line 2—2 of Fig. 1;

Fig. 3 is a sectional view, taken on line 3—3 of Fig. 1; and

Fig. 4 is a fragmentary cross-sectional view through the drum flange and a clutch shoe, showing the clutch lining applied to the shoe.

Referring to the drawing in detail, our improved centrifugally-operated clutch device includes a sleeve-like hub 5 which is adapted to be mounted on a drive shaft 6 and to be keyed thereto by a key 7. The shaft 6 may, as a matter of convenience, be considered the drive shaft of a motor or engine, indicated at 8 in Fig. 2. Secured to the hub 5, as by welding, is a pair of axially-spaced abutment plates 10 and 11 which are parallel to each other and extend in planes normal to the axis of the hub. Held in holes 12 of the plates 10 and 11 are the reduced ends of spring reaction pins 13. The plates 10 and 11 are substantially rectangular in outline although their ends are slightly arcuate. The plates 10 and 11 are notched at their corners so as to provide V-shaped recesses 15, one side 16 or 16' of each recess extending substantially radially with respect to the axis of the hub 5, and being hereinafter referred to as an abutment face.

Adapted to be carried by and between the plates 10 and 11 are arcuate clutch shoes 19 and 20 which have their end portions reduced in width to provide abutment shoulders 21 adapted to rest upon the abutment faces 16 and 16' as shown in Fig. 1. The ends of the shoes 19 and 20 are inclined as indicated at 22 to provide clearance in the manner and for the purpose to be later explained.

The clutch shoes 19 and 20 are normally maintained in the inoperative position shown in Fig. 1, that is, with their abutment shoulders 21 resting against the abutment faces 16 and 16' of the plates 10 and 11 under the action of springs 25 and 26. The springs 25 and 26 are of the torsion type, each comprising a helical coil of relatively large diameter and which surrounds one of the spring-reaction pins 13. Each spring 25 and 26 has the end portions of its coil bent outwardly in opposite directions to provide spring arms 27 and 28. The ends of the arms 27 and 28 engage in apertures 29 and 30 provided at the opposite ends of the respective clutch shoes 19 and 20 and due to the inherent resiliency of the springs 25 and 26, and their respective arms 27 and 28, the shoes are normally held in the retracted position illustrated in Fig. 1. During rotation of the hub 5 and its plates 10 and 11, however, the clutch shoes 19 and 20 are subjected to centrifugal force which acts to move the shoes radially outward against the action of the springs 25 and 26 and into engagement with the driven member, which is next described.

The driven member consists of a dish-shaped drum 32 which has an annular flange 33 overlying the clutch shoes 19 and 20 to adapt the flange to be engaged by the shoes when the latter are moved outwardly under the influence of centrifugal force, so as to effect rotation of the drum. Preferably the inner surface of the circular flange 33 is lined with a material 35 possessing a relatively high coefficient of friction so that a positive driving action is obtained. The drum 32 is formed with or suitably attached to a sleeve-like hub 34 which is adapted to be mounted on the end of a driven shaft 36 and keyed for rotation therewith by means of a key 37.

Assuming that the drive shaft 6 is rotating, for example, in clockwise direction as viewed in Fig. 1, the hub 5, plates 10 and 11, springs 25 and 26 and the clutch shoes 19 and 20 will rotate therewith. At low speeds the springs 25 and 26 act to maintain the clutch shoes 19 and 20 in their retracted position as shown in Fig. 1 so that the shoes are prevented from contacting the clutch lining 35. Consequently, no torque is applied to the drum 32 and the latter remains stationary. As the rotational speed of the driving unit 6, 5, 10, 11, 19 and 20 is increased, the centrifugal force is likewise increased and eventually this force overcomes the torsional force of the springs 25 and 26 and causes the clutch shoes 19 and 20 to move radially outward into engagement with the clutch lining 35 to apply torque thereto so as to cause rotation of the drum 32 and shaft 36. As the speed of rotation of the drive shaft 6 is further increased, the shoes 19 and 20 are moved with greater force against the clutch lining 35. Since the plates 10 and 11, springs 25 and 26, and shoes 19 and 20 are each symmetrical, the shoes are capable of applying torque to the drum 32 when the shaft 6 is rotated in either direction.

During the rotation of the shaft 6 in clockwise direction, for example, the abutment faces 16' engage the abutment shoulders 21 of the shoes 19 and 20 and act to push the shoes in a circular path. Due to the peculiar mounting of the shoes on the plates 10 and 11, the shoes are capable of adjusting themselves to the contour of the clutch lining 35 and it is thus seen that a more firm and positive clutching action is produced than is effected when centrifugally actuated shoes of the conventional pivoted type are employed.

The present clutch device is regenerative in that the tangential force transmitted by the shoes is greater than the product of the outward force due to centrifugal force of the shoes against the clutch lining times the coefficient of friction between the shoes and lining. In other words, the clutch tends to tighten itself during rotation of the drive shaft 6. The magnitude of the regenerative effect may be varied by slight changes in the design of the parts. For example, moving the abutments 16 and 16' radially inward increases the regeneration. Changing the abutment faces 16 and 16' from radial increases the regeneration, provided the change is in the direction which will cause the shoes to press more firmly against the clutch lining 35 and, of course, the converse is also true. Increase of the cofficient of friction between the shoes and lining material, by changing the type of lining, also increases the regeneration. By proper choice of the several factors mentioned above, a clutch which will transmit any desired torque at predetermined rotational speeds and release at any selected rotational speeds, not greater than the predetermined rotational speeds, can be readily designed, the "release" speed being, of course, lower than the engaging or driving speed. It is found that at relatively high rotational speeds, the torque transmitted by the clutch device is nearly proportional to the square of the speed less a constant. In the range of the engaging speed, torque increases much more rapidly than the square of the speed, and at very high speeds the torque approaches proportionality. Moreover, by our invention, it is possible to design the clutch so that it has substantially the same characteristics when its parts are worn as when new.

While Figs. 1 to 3 of the present drawing show the clutch lining 35 as applied to the inner surface of the drum flange 33, it is within the concept of our invention to apply it to the driving surfaces of the shoes 19 and 20, as indicated in Fig. 4, or to apply it to both the surface of the drum flange and the shoes.

While we have herein shown and described the improved clutch device as embodied in two preferred forms of construction, by way of example, it will be apparent that further modifications might be made in the structure without departing from the spirit of the invention. Consequently, we do not wish to be limited in this respect, but desire to be afforded the full scope of the appended claims.

We claim as our invention:

1. A clutch, comprising: a rotatable driving hub provided with axially-spaced, substantially rectangular plates fixed thereto and disposed in planes normal to the axis of said hub; arcuate clutch shoes having reduced extensions at their ends, said extensions being slidably disposed between said plates, said extensions providing transverse shoulders restable against edges of said plates, said shoes being floatable and bodily movable radially; pins extending between said plates; a driven drum disposed coaxially with said hub and overlying said shoes, said drum providing a circular clutch surface adapted to be engaged by said shoes; and torsion springs disposed between said plates and retained in place by said pins, each of said springs having its ends engageable with the opposite ends of one of said shoes to withhold said shoes from engagement with said clutch surface uniformly throughout their length, said springs being adapted to yield in response to centrifugal force of predetermined magnitude imposed on said shoes during rotation of said driving hub, to allow outward radial movement of said shoes into engagement with said clutch surface so as to effect a driving connection between said hub and said drum.

2. A clutch, including: a rotatable driving hub provided with axially-spaced plates; arcuate clutch shoes having extensions of reduced thickness at their ends, said extensions being disposed between said plates and the remaining portions of said shoes being disposed without the space between the plates, said shoes being floatable and bodily movable radially, said extensions being slidable between said plates; a driven drum disposed coaxially with said driving hub and overlying said shoes, said drum providing a circular clutch surface adapted to be engaged by said shoes; and spring means disposed between said plates and engageable with the ends of said clutch shoes and normally operative to withhold said shoes from engagement with said clutch surface, said spring means being adapted to yield in response to centrifugal force of predetermined magnitude imposed on said shoes during rotation of said driving hub, to allow outward radial movement of said shoes into engagement with said clutch surface uniformly throughout their lengths so as to cause said driving hub to drive said drum.

3. A clutch as defined in claim 2, in which said plates and said shoes have abutment faces adapted to interengage when said driving hub is rotated.

4. A clutch as defined in claim 2, in which said plates are substantially rectangular and said shoes and said plates have substantially radial abutment faces adjacent their ends adapted to interengage when said driving hub is rotated.

HOWARD B. LEWIS.
HOWARD FIELD, Jr.

REFERENCES CITED

The following references are of record in the file of this patent:

UNITED STATES PATENTS

| Number | Name | Date |
|---|---|---|
| 1,863,382 | Persons | June 14, 1932 |
| 2,179,945 | Maurer | Nov. 14, 1939 |
| 2,230,293 | Harris | Feb. 5, 1941 |
| 2,275,046 | Harris | Mar. 3, 1942 |
| 2,286,461 | Burns | June 16, 1942 |
| 2,422,121 | Norstrom et al. | June 10, 1947 |

FOREIGN PATENTS

| Number | Country | Date |
|---|---|---|
| 206,699 | Great Britain | Nov. 15, 1923 |
| 273,918 | Great Britain | July 14, 1927 |
| 533,096 | Great Britain | Feb. 6, 1941 |
| 579,383 | Germany | June 8, 1933 |